United States Patent

Corma Canos et al.

[11] Patent Number: 5,492,874
[45] Date of Patent: Feb. 20, 1996

[54] ACTIVE COMPONENT FOR THE CAPTURE OF BASIC NITROGEN IN CATALYTIC CRACKING CATALYSTS (FCC)

[75] Inventors: Avelino Corma Canos; Francisco Andres Mocholi Castelo, both of Valencia, Spain

[73] Assignees: Consejo Superior Investigaciones Cientificas, Madrid; Universidad Politecnica Valencia, Valencia, both of Spain

[21] Appl. No.: 131,521

[22] Filed: Jul. 6, 1993

[60] Continuation of PCT/ES92/0073, Nov. 6, 1992.

[30] Foreign Application Priority Data

Nov. 7, 1991 [ES] Spain ..................... 9102468

[51] Int. Cl.$^6$ ..................... B01J 29/06
[52] U.S. Cl. ..................... 502/64; 502/68
[58] Field of Search ..................... 502/64, 68

[56] References Cited

U.S. PATENT DOCUMENTS

| | | | |
|---|---|---|---|
| 4,469,807 | 9/1984 | Audeh et al. | 502/74 |
| 5,236,878 | 8/1993 | Inoue et al. | 502/68 |
| 5,286,693 | 2/1994 | Ino et al. | 502/68 |

FOREIGN PATENT DOCUMENTS

| | | |
|---|---|---|
| 3711599 | 10/1987 | Germany. |
| 2063700 | 10/1981 | United Kingdom. |
| WOA9102044 | 2/1991 | WIPO. |

*Primary Examiner*—Asok Pal
*Attorney, Agent, or Firm*—Darby & Darby

[57] ABSTRACT

An active component is used for capturing basic nitrogen in field catalytic cracking (FCC). The active component contains a modified sepiolite consisting of a modified magnesium silicate in which divalent Mg cations have been substituted by trivalent Al cations. The component has a surface area of between 50 and 600 m$^2$/g and an average pore radius of between 20 and 110 Å.

6 Claims, No Drawings

ACTIVE COMPONENT FOR THE CAPTURE OF BASIC NITROGEN IN CATALYTIC CRACKING CATALYSTS (FCC)

This is a continuation of international application Ser. No. PCT/ES92/00073, filed Nov. 6, 1992.

BACKGROUND OF THE INVENTION

During the catalytic cracking process (FCC) an attempt is made to avoid the harmful effect that several compounds, such as azotic compounds and metals, especially vanadium, which are contained in feed, exert on the catalyst. All along the process of reactions that take place in the riser, these compounds are deposited on the catalyst that becomes either reversibly or irreversibly, poisoned through their action over its most active ingredient, zeolite, while the active centres or their structure are respectively poisoned or destroyed. There are two possible solutions to avoid this danger. The first one consists in a hydro-treatment of the power supply to the FCC, This solution, although quite effective, is very seldom put into practice due to its high price. The second alternative entails the incorporation of additives into the catalyst as components ready to be sacrificed while strongly interacting with the poisons.

In the case of poisoning through azotic compounds present in the feed, these are very actively adsorbed, if they are of a basic character, on the acid centres of zeolite, making the catalyst activity rapidly diminish; this effect is much more notorious in catalysts containing highly stable zeolite of a low cell unit (A. Corma, V. Fornes, J. B. Montón and A. V. Orchillés, Ind. Eng. Chem. Res., 26, 882 (1987); Scherzer and O. P. McArthur, Ind. Eng. Chem. Res. 27, 1571 (1988). The harmful effect of the basic azotic compounds may be reduced by the use of active matrices of aluminum or silica-aluminum which, apart from providing an additional activity to that of zeolite, have also the ability to capture the nitrogen compounds (L. D. Silverman, S. Winkler, J. A. Tiethof and A. Witoshkin AM-86- 62 NPRA Annual Meeting Mar. 23–25 (1986); J. E. Otterstedt, S. B. Gevert S. Järas and P. G. Menon, Appl. Catal. 22, (1986); J. E. Otterstedt, Y. M. Zhu and J. Sterte, Appl. Catal. 38, 143 (1988); B. K. Speronello and G. W. Young, Oil § Gas J. 82, 139 (1984).

A new material derived from sepiolite has recently been presented. It possesses acid properties and may be used as an active component of a FCC catalyst (A. Corma, V. Fornés, A. Mifsud and J. Pérez Pariente, Clay Minerals 19, 673, (1984) ibid ACS Syrup. Ser. 452 (Fluid Catalytic Cracking II), 293 (1990.)

The present patent of invention shows how an aluminum sepiolite of the type described in the two above-mentioned works, can be used as a matrix component for the purpose of passifying the nitrogenous compounds responsible for the poisoning of zeolite, and may favourably compete with the more effective materials used so far, such as silica-alumina.

SUMMARY OF THE INVENTION

The present invention refers to the incorporation of a sepiolite, in which some of the edge $Mg^{2+}$ have been replaced by trivalent cations follow the above-described procedure (Sp. patent 527.756 (1983), to a FCC catalyst. This component presents a high quantity of Lewis acid centres of a mean potency, which are capable of producing a strong interactivity with azotic basic compounds as shown by the pyridine strip adsorbed on the Brönsted ($1545^{-1}$ cm) and Lewis (1455 $cm^{-1}$) centres from a sample where $Al^{3+}$ has been introduced.

DETAILED DESCRIPTION OF THE INVENTION

The conformation of the FCC catalyst is carried out following procedures which are well known to the catalyst manufacturers, according to which the sepiolite interchanged with trivalent cations, preferably $Al^{3+}$, is introduced in a percentage weight fluctuating between 10 and 80% of that of the final catalyst, if incorporated in the same particles as zeolite had been. In the case of the introduction being made in particles other than those containing zeolite, the weight percentage would lie between 20 and 70%. In the first case, the rest of the catalyst is composed of a silica-colloidal or alumina (chlorhydrol) binder in a percentage of up to 10%; the zeolitic component goes in a 10–30% proportion, and the rest, up to 100%, is made of kaolin. In the second case, i.e., that in which sepiolite is incorporated to other particles than those containing zeolite, these are composed, apart from sepiolite (20–70%), by a binder of the same type as the above named (2–20%), while the rest, up to 100%, is made of kaolin.

The following examples show the behaviour of a zeolitic-type catalytic cracking, which contains alumina sepiolite, for a vacuum gasoil cracking containing 5,000 ppm of basic nitrogen (quinoleine.) Its behaviour is compared to that of an equivalent catalyst which contains, as a difference, a commercially available silica-alumina (25% $Al_2O_3$).

EXAMPLES

EXAMPLE 1

A catalyst containing 20%, in terms of weight, of a highly stable zeolite with a cell unit of a 2,428 nm in size, and 80% of aluminum sepiolite prepared according to the reference (Sp. patent no. 527. 756 (1983) , was used, after burning at 600° C., for cracking a vacuum gasoil with 20 pm nitrogen, in a fixed MAT type bed reactor. The reaction conditions were 482° C., with a catalyzer/feeding ratio of 1:1 g.g.$^{-1}$ and a response time of 60 seconds. The total conversion obtained (diesel, plus gasoline, gases and cokes) rose to 69.1%. Diesel, gasoline, gases and coke yields were 19.6, 37.4, 10.0 and 2.1% respectively.

Under the same conditions, a catalyst prepared with the same proportions of the same zeolite but where sepiolite had been replaced by an areorphic silica-alumina commercially available (25% $Al_2O_3$), rendered a 74% conversion, with 18.2, 39.2, 14.6 and 2.4% as respective yields for diesel, gasoline, gases and coke.

EXAMPLE 2

A vacuum gasoil catalyst cracking equivalent to example 1, with the addition of 5000 ppm of nitrogen (quinoleine), under the same experimental conditions over the two alumina sepiolite and silica-alumina catalysts described in example no. 1.

The conversion of the sepiolite catalyst was 62.5% by weight and the yields in diesel, gasoline, gases and coke were 19.7, 35.3, 5.7 and 1.8% respectively.

When the areorphic silica-alumina was used, the conversion was 64.0% in terms of weight and the yields amounted to 20.5, 34.0, 8.0 and 1.5%.

Upon comparison of the results of examples 1 and 2, it was noted that a fresh sepiolite catalyst brought about a better passivation than the amorphic silica-alumina catalyst (also fresh) before a steam deactivation.

EXAMPLE 3

In order to simulate the conditions of a balance catalyst, the catalysts described in example no. 1 were treated at 750° C. in the presence of steam (100%.)

An experiment analogous to that of example 2 was carried out with the catalysts that had been deactivated with steam, the catalyst/feeding ratio being also 1.1 g.g.$^{-1}$ in this case.

The catalyst which contained aluminum sepiolite gave a conversion of 60.4% with diesel, gasoline, gas and coke yields of 18.8, 34.6, 5.3 and 1.6% respectively.

The catalyst that contained silica-alumina, gave a conversion of 54.2%, with a product breakdown of 18.1, 30.8, 4.4 and 0.9%.

EXAMPLE 4

In this case a description was made of the results obtained with the same catalysts and under the same conditions as those of example 3, but with the introduction of 5,000 ppm of nitrogen (quinoleine) in the food.

With the sepiolite catalyst the conversion obtained was 41.6%. The diesel, gasoline, gas and coke yields were 18.7, 16.9, 3.2 and 2.8% respectively. When a silica-alumina catalyst was used, the total conversion in terms of weight was 37.8%, with yield values of 18.4, 14.6, 2.6 and 2.2%.

Examples 3 and 4 show a stronger passivating effect of the basic nitrogen compounds on the part of aluminum sepiolite.

EXAMPLE 5

This example described the influence of the sepiolite contents over the passivating effect. A catalyst similar to that of example 1 was prepared for that purpose, with equal contents and the same type of zeolite but with 30% of aluminum sepiolite, and kaolin as the remaining contents.

The final catalyst was treated with water steam under the conditions of example 3. The response conditions and the composition of the feeding agents were the same as in example 4.

The results obtained were the following: weight conversion 35.4% and diesel, gasoline, gas and coke yields, 18.3, 14.5, 1.6 and 0.8%, respectively.

We claim:

1. An active component for capturing basic nitrogen in FCC catalysts for catalytic cracking, comprising a modified sepiolite consisting of a modified fibrous magnesium silicate in which divalent Mg cations are substituted by trivalent Al cations, and having textural characteristics of a surface area of between 50 and 600 m$^2$/g and an avenge pore radius of between 20 and 110 Å.

2. An active component according to claim 1, wherein the modified fibrous magnesium silicate originates from a modified sepiolite.

3. An active component according to claim 1, wherein the modified fibrous magnesium silicate originates from a natural sepiolite.

4. An FCC zeolite catalyst including an active component according to claim 1, said catalyst comprising particles containing zeolite, wherein sepiolite is incorporated in the particles containing zeolite, whereby said particles apart from the sepiolite comprise up to 10% of a colloidal silica linking material, 10–30% of a zeolite component and kaolin.

5. An FCC zeolite catalyst including an active component according to claim 1, said catalyst comprising particles containing zeolite, wherein sepiolite is incorporated in the particles containing zeolite, whereby said particles apart from the sepiolite comprise up to 10% of an alumina linking material, 10–30% of a zeolite component, and kaolin.

6. An FCC zeolite catalyst including an active component according to claim 1, said catalyst containing particles containing zeolite, and further containing particles incorporating sepiolite and comprising 20–70% sepiolite, 2–20% of a colloidal silica linking material and an alumina linking material, and kaolin.

* * * * *